United States Patent Office.

FRANÇOIS AROUD, OF LYONS, FRANCE.

Letters Patent No. 94,695, dated September 14, 1869.

IMPROVED SWEETMEAT.

The Schedule referred to in these Letters Patent and making part of the same.

*To all whom it may concern:*

Be it known that I, FRANÇOIS AROUD, of Lyons, department of the Rhone, in the Empire of France, have invented "a novel kind of Sweetmeat;" and I do hereby declare that the following is a full and exact description thereof.

The nature of my invention consists in presenting Liebig's or any other extract of meat in the form of a sweetmeat.

I take sugar, say seven ounces, (avoirdupois weight;) apricot, or other marmalade, one ounce twelve drachms; rum, eleven drachms; extract of meat, eleven drachms.

Of the sugar I make a sirup, which I cook to the degree known by confectioners as "*au petit cassé.*"

I dilute the marmalade and the extract of meat with the rum.

I then pour the mixture of marmalade, extract, and rum into the boiling sirup, and run the whole into starch previously stamped or moulded to the form which it is desired to give to the sweetmeats, which are then dried in a stove, and finally candied in a cold sirup.

I do not propose to limit myself to the proportions above given, nor to the use of any particular extract of meat, using Liebig's, or any other which I may find suitable for my purpose, as also any sort of marmalade or analogous preparation, and whatever spirit and perfume I may find desirable.

What I claim as my invention, and desire to secure by Letters Patent, is—

The incorporation of extract of meat in a sweetmeat, substantially as herein set forth.

FRANÇOIS AROUD.

Witnesses:
G. ANENEYIRE,
ALBERT J. DE ZEYLE.